(12) United States Patent
Getty et al.

(10) Patent No.: US 7,180,308 B2
(45) Date of Patent: Feb. 20, 2007

(54) SCREENING FOR ELECTRICAL CONDUCTIVITY OF MOLECULES BY MEASURING SURFACE POTENTIAL

(75) Inventors: Ross Getty, Wilmington, DE (US); Simona Percec, Philadelphia, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 140 days.

(21) Appl. No.: 10/817,089

(22) Filed: Apr. 2, 2004

(65) Prior Publication Data

US 2004/0245980 A1 Dec. 9, 2004

Related U.S. Application Data

(60) Provisional application No. 60/459,790, filed on Apr. 2, 2003.

(51) Int. Cl.
  *G01R 27/08* (2006.01)
  *G01R 19/00* (2006.01)
(52) U.S. Cl. .................... 324/691; 324/76.11
(58) Field of Classification Search ......... 324/691, 324/649, 600, 750–753, 692, 693, 719, 722, 324/439, 457, 458, 713, 158.1; 204/400, 204/229.8, 196.06, 556, 228.6; 422/82.02; 438/680–683, 676, 677, 451, 452, 656, 925
See application file for complete search history.

(56) References Cited

U.S. PATENT DOCUMENTS

| | | | |
|---|---|---|---|
| 5,556,524 A * | 9/1996 | Albers ................... 204/403.06 |
| 5,683,569 A * | 11/1997 | Chung et al. ............... 205/775 |
| 5,945,832 A | 8/1999 | Harvey, III et al. |
| 6,427,946 B1 * | 8/2002 | Petrenko ................. 244/134 R |
| 6,432,723 B1 * | 8/2002 | Plaxco et al. ............... 436/518 |
| 6,518,022 B1 * | 2/2003 | Sosnowski et al. ............ 435/6 |
| 6,624,071 B2 * | 9/2003 | Seki .......................... 438/681 |
| 6,720,553 B2 * | 4/2004 | Bonnell et al. .......... 250/252.1 |
| 6,723,971 B1 * | 4/2004 | Petrenko et al. ............ 219/770 |
| 6,873,163 B2 * | 3/2005 | Bonnell et al. ............. 324/719 |
| 2004/0161873 A1 * | 8/2004 | Dimitrakopoulos et al. .. 438/99 |

OTHER PUBLICATIONS

J. Lu et al., Kelvin Probe Force Microscopy on Surfaces: Investigation of the Surface Potential of Self-Assembled Monolayers on Gold, Langmuir, vol. 15, pp. 8184, 1999.

Dhirani et al., Self-assembled molecular rectifiers, J. Chem. Phys, 106312), Mar. 22, 1997 vol. 106, pp. 5249, 1997.

Yan et al., Patterning a Preformed, Reactive SAM Using Microcontact Printing, J. Am. Chem. Soc., 120: pp. 6179-6180, 1998.

Schon et al., Self-assembled monolayer organic field-effect transistors, Letters to Nature, vol. 413, Oct. 18, 2001, pp. 713-716.

(Continued)

*Primary Examiner*—Anjan Deb
*Assistant Examiner*—Hoai-An D. Nguyen (57) ABSTRACT

Surface potentials of a number of patterned conducting and insulating self-assembled monolayers (SAMs) were measured by scanning surface potential microscopy (SSPM) as part of a study in molecular electronics. Differences in surface potential were measured for insulating and conducting molecule SAMs on gold. The SAMs were patterned by microcontact printing.

6 Claims, 9 Drawing Sheets

OTHER PUBLICATIONS

Motomatsu et al., surface structure of a fluorinated thiol on Au(111) by scaning force microscopy, Thin Solid Films, 281-281, 1996, pp. 548-551.

Percec et al., Synthesis, Structural Analysis, and Self-Assembly of Phenylene Ethynylene Oligomers and Their -F, -CF$_3$, and -CH$_3$ Substituted Derivatives, DuPont Central Research and Development, pp. 541-550, Jul. 31, 2003.

Uchihashi et al., High-resolution imaging of organic monolayers using noncontact AFM, Applied Surface Science 157(2000), 244-250.

Xia et al., Soft Lithography, Annu. Rev. Mater. Sci., 1998 28: pp. 153-184.

Saito et al., Surface potentials of patterned organosilane self-assembled monolayers acquired by Kelvin probe force microscopy and ab initio molecular calculation, Chemical Physics Letters 349, 2001, pp. 172-177.

Sugimura et al., Surface potential microscopy for chemistry of organic self-assembled monolayers in small domains, Department of Material Science an dEngineering, Published Jan. 22, 2003.

Schon et al., Field-Effect Modulation of the Conductance of Single Molecules, Science, Dec. 7, 2001, vol. 294.

Iwami et al., Journal of Electroanalytical Chemistry, 2004, 546(1-2), 77-83.

Sugimura et al., AIP Conference Proceedings (2003), 696 Scanning Tunneling Microscopy Spectoscopy and Related Techniques, 150-157.

Saito et al., Japanese Journal of Applied Physics, Part 1, Regular Papers, Short Notes & Review Papers, 2003, 42(4B), 2534-2537.

Patel et al., Abstracts of Paper, 225[th]ACS National Meeting, New Orleans, LA USA, Mar. 23-27, 2003, Coll-283 Publisher: American Chemical Society, Washington, D.C.

Wu et al., Surface and Interface Analysis, 2003, 35(1), 94-98.

Getty et al., Materials Research Society Symposium Proceedings (2002), 727, Nanostructured Interfaces, 155-160.

Saito et al., Surface and Interface Analysis (2002), 34(1), 601-605.

Hayashi et al., Regulation of the Surface Potential of Silicon Substrates in Micrometer Scale with Organosilane Self-Assembled Monolayers, Langmuir (2002), 18(20), 7469-7472.

Hayashi et al., Surface potential contracts between silicon surfaces covered and uncovered with an organosilane self-assembled monolayer, Ultramicroscopy (2002), 91(1-4), pp. 151-156.

Howell et al., Molecular Electrostatics of Conjugated Self-Assembled Monolayers on Au(111) using Electrostatic Force Microscopy, Langmuir, 2002, 18(13), 5120-5125.

Sugimura et al., Surface Potential Nanopatterning Combining Alkyl and Fluoroalkylsilane Self-Assembled Monolayers Fabricated via Scanning Probe Lithography, Advanced Mterials, (Weinheim, Germany, 2002, 14(7), 524-526.

Sugimura et al.,Kelvin Probe Force Microscopy Images of Microstructured Organosilane Self-Assembled Monolayers, Japanese Journal of Applied Physics, Part 1: Regular Papers, Short Notes & Review Papers, 2001, 40(6B), 4373-4377.

* cited by examiner

SCREENING FOR ELECTRICAL CONDUCTIVITY OF MOLECULES BY MEASURING SURFACE POTENTIAL

This application claims the benefit of U.S. Provisional Application 60/459,790, filed Apr. 2, 2003

FIELD OF INVENTION

The invention is a screening method for determining molecular electrical conductivity by using scanning surface potential microscopy to measure a self-assembled monolayer of molecules.

BACKGROUND

The development of molecular scale electronic applications makes it necessary to generate uniquely tailored and controlled self-assembled monolayers (SAMs), both to facilitate the characterization of new potential molecular constituents and as a path to device fabrication. Conducting and switching molecule SAMs have been postulated as the active elements in field effect transistors. Compounds with nonlinear electronic properties are the focus of single molecule electronics.

U.S. Pat. No. 5,945,832 measured molecular conductivity of compounds using ultra-fine gap electrodes. This method, however, is time-consuming, complicated, and cannot measure more than one compound at a time.

There is a need for a screening technique for determining the conductivity of molecules. The measurement of the conductivity of single molecules is extremely difficult and no readily accessible, simple technique exists for this purpose. Present techniques for measuring the conductivity of single molecules are extremely difficult to execute. Bulk measurements of conductivity measure molecule-to-molecule electron hopping and not single molecule properties.

J. Lu et al (*Langmuir*, 15, 8184, 1999) used Kelvin probe force microscopy to measure the local contact potential difference of various linear alkanethiol SAM's on gold substrates. A. Dhirani et al (*J. Chem Phys*, 106, 5249, 1997) showed that SAM's of some alkynethiols on gold substrates exhibited electrical rectifying behavior when probed by scanning tunneling microscopy, whereas alkanethiols and aromatic thiols did not have rectifying characteristics. In none of these cases was the use of surface potential related to molecular conductivity.

The present invention allows for the screening of molecular properties by using the measurement of the surface potential of a self-assembled monolayer of molecules to give an evaluation of the conductivity of those molecules. Scanning surface potential microscopy has been used to measure surface potential variations in patterned SAMs with different terminating groups, allowing the facile screening of the conductivity of molecular structures.

SUMMARY OF THE INVENTION

The invention is directed to a method to determine the molecular electrical conductivity of a compound, comprising the steps of: a) forming a self-assembled monolayer of the compound on a substrate; and b) measuring the difference between the surface potential of the substrate and the surface potential of the self-assembled monolayer comprising the step of using surface scanning potential mapping. The invention is also directed to a method to determine the relative molecular electrical conductivities of a plurality of compounds, comprising the steps of: a) forming a discrete area of a self-assembled monolayer for each compound on a single substrate; and b) measuring the surface potential of each discrete area comprising the step of using surface scanning potential mapping for each self-assembled monolayer.

DETAILED DESCRIPTION OF THE INVENTION

The invention relates to a method of determining the electrical conductivity of a molecular monolayer using the technique of scanning surface potential microscopy or mapping. The method is facile and permits the determination of electrical conductivity for a plurality of molecules on a single substrate.

The ability to screen the conductivity of single molecules is useful in determining the correct and necessary components for nano-electrical devices. A rapid and effective screen for molecular conductivity will facilitate the selection of specific molecules for specific functions with any particular nano-electrical device.

The following abbreviations and definitions may be used for the interpretation of the specification and the claims.

"AFM" is atomic force microscopy.

"CVD" is chemical vapor deposition.

"ECB" is 4-ethynyl-cyanobenzene-4'-ethynylphenyl-cyanobenzene.

"E2CB" is 4-ethynyl(1,2-dicyanobenzene)-4'-ethynylphenyl-1 (4,5-dicyanobenzene).

"EFCB" is 4-ethynyl(2-fluoro-cyanobenzene)-4'-(ethynylphenyl)-1(2-fluoro-cyanobenzene).

"EFTB" is 1-ethynyl-4-fluorobenzene-4'-(thioacetyl)benzene.

"FDT" 11 is 1,1,1,2,2,3,3,4,4,5,5,6,6,7,7,8,8-heptadecanefluoro-10-decane thio [$CF_3(CF_2)_7(CH_2)_2SH$].

"HDT" is hexadecanethiol.

"PETB" is -phenyl ethynyl-4-thioacetyl benzene.

"SAMs" is self-assembled monolayers.

"SPM" is scanning probe microscopy

"SSPM" is scanning surface potential microscopy.

"TOF-SIMS" is time-of-flight secondary ion mass spectroscopy.

The present invention has brought together a number of capabilities critical to generating a screening technique for molecular electrical conductivity. By "molecular electrical conductivity" it is meant the intramolecular conductivity; that is, the conductivity along the molecule and not between molecules. Intramolecular conductivity is distinguished from inter-molecular conductivity as it is not a bulk property but is a function of the molecule itself.

Self-assembled monolayers are particularly useful for the determination of molecular conductivity, particularly in the context of the measurement of surface potential. This is so primarily because electrical probing is along the length of the molecules in the SAM, and properties relating to transport along the molecule are being sensed and not overridden by inter-molecular parameters. Surface potential is not an obvious marker for molecular conductivity as it involves factors not directly related to transport, such as dipole moment, surface work function, screening and attachment effects. The presence of sharp boundaries between the SAM of the molecule being screened and the substrate surface (e.g. gold) results in measuring accurate differences in surface potential. This overcomes the considerable experimental difficulties in making absolute surface potential measurements, particularly for small values of surface potential.

Self-Assembled Monolayers

Self-assembled monolayers (SAMs) is a term well recognized in the art and can be prepared using many different types of molecules and different substrates. Any method which produces discrete patterns with sharp boundaries is suitable. One particularly useful method is microprinting. Microprinting preparation of SAM's are described in L. Yan, X.-M. Zhao, G. M. Whitesides, *J. Am. Chem. Soc.,* 120, 6179, (1998), and Y. Xia, G. M. Whitesides, *Annu. Rev. Mater. Sci.,* 28, 153, (1998). Any molecule that can form a SAM can be used in the practice of the present invention. Molecules that have functional groups, especially terminal groups, that can attach to the substrate can generally form suitable SAM's. Examples of types of attachment to the substrate include but are not limited to:

covalent bonding, such as thiols on a Au substrate
surface coordination, such as cyano groups on Au
metal polarization, such as naphthalene on Cu
coupling of electronic state, such as $C_6F_5S$— on Cu
ionic bonding, such as thiophene on Al Compounds that form SAM's are common and well known in the art (see for example "Self-Assemblied Monolayers", Kirk-Othmer Encyclopedia of Chemical Technology, "John Wiley & Sons, Inc., DOI: 10.1002/ 0471238961.1315141521121301.a01, Dec. 4, 2000.)

Substrates that are suitable for the present invention include metals, semiconductors, silica, and glass. Particularly useful are metals, such as but not limited to Au, Ag, Pd, Pt, Cu, Al and Ni. Au is the most common substrate used to form SAM's.

Scanning Surface Potential Microscopy/Mapping

Scanning surface potential microscopy is a type of scanning probe microscopy (SPM). There are numerous types of SPM technologies, including atomic force microscopy (AFM), scanning tunneling microscopy (STM), lateral force microscopy (LFM), magnetic force microscopy (MFM), electrostatic force microscopy (EFM), and scanning thermal microscopy (SThM), which are all used for visualizing and manipulating atoms and atomic scale structures. STMs measure a weak electrical current flowing between the tip and the sample. STMs rely on the electrical conductivity of the sample, so features on the sample surface must be electrically conductive to some degree. STM systems measure the quantum tunneling current between a wire or metal-coated silicon tip and the object surface. An electronic feedback system maintains a constant current by positioning the tip at a substantially constant height above the surface.

Figure 5:
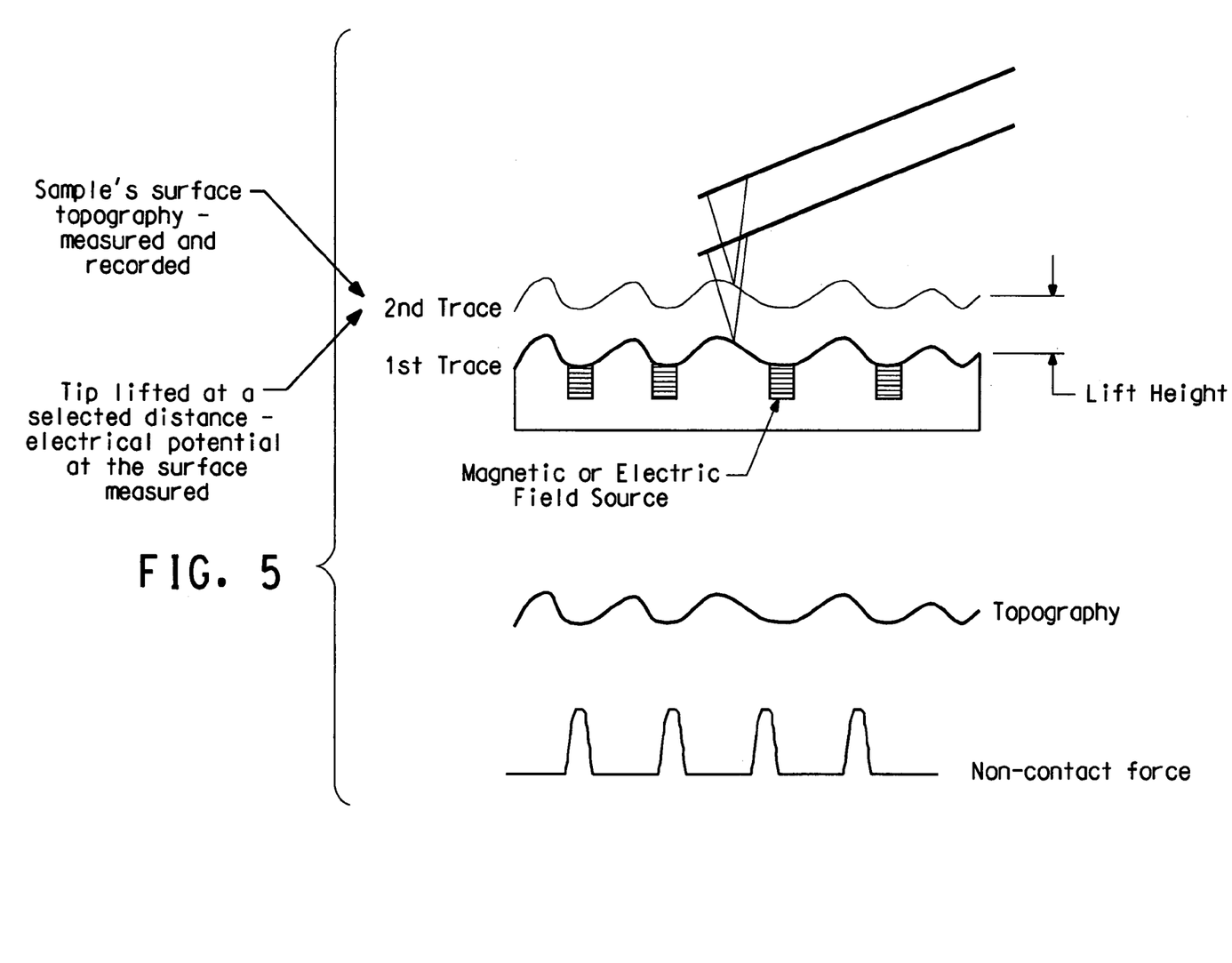
FIG. 5 is a schematic of scanning surface potential microscopy illustrating the lift mode two-pass technique.

Scanning surface potential mapping is a technique for measuring surface potential on the molecular scale using an AFM and is based on the dual scan concept. The grounded tip first acquires surface topography in the intermittent contact mode, then retraces the surface profile maintaining constant tip-surface separation. During the second scan the tip is no longer driven mechanically by the piezoactuator; rather an ac bias is applied directly to the tip. The bias results in the periodic force at the bias frequency, whose amplitude and phase depend on the driving frequency, tip surface capacitance and driving amplitude. This process is illustrated by the schematic drawing in FIG. 5. The lock-in technique is used to select the first harmonic of the force and feedback is used to nullify this first harmonic by adjusting the dc component of the tip bias. For conductive surfaces this condition is achieved when the tip bias is equal to the surface bias, and mapping the former yields the surface potential map. This technique is very robust in that it is relatively insensitive (compared to AFM) to surface topographic artifacts.

Surface Potential Values and SAM Quality

The surface potential of a SAM is related to the number of monolayers of the SAM present. In the presence of multiple monolayers the surface potential increases. No attempt had been made to correlate "noise" in the surface potential with high spots in the surface topography. The existence of high islands on SAM surfaces on gold is known and has been investigated. One conclusion is that the SAM molecular orientation is affected by ridges in the gold surface that lead to different attachment angles for the molecule [(M. Motomatsu, W Mizutani, H-Y Nie, H. Tokumoto, *Thin Solid Films,* 281–282, 548, (1996)).

The present invention is a method to determine the molecular electrical conductivity of a compound, comprising the steps of: a) forming a self-assembled monolayer (SAM) of the compound on a substrate; and b) measuring the difference between the surface potential of the substrate and the surface potential of the self-assembled monolayer comprising the step of using surface scanning potential mapping. The SAM can be prepared by any method known in the art on a suitable, inert substrate. The SAM can be of any shape or pattern as long as one or more discrete areas can identified by the AFM tip. By "discrete area" it is meant that the SAM's are not in physical or electrical contact with each other.

The present invention also comprises a method to determine the relative molecular electrical conductivities of a plurality of compounds, comprising the steps of: a) forming a discrete area of a self-assembled monolayer for each compound on a single substrate; and b) measuring the surface potential of each discrete area comprising the step of using surface scanning potential mapping for each self-assembled monolayer. The different SAMs can be patterned in any manner or shape as long as discrete areas are present. One method is to flood an existing SAM pattern with a oleophobic molecule which will form a SAM on the inert substrate but will not adhere or contaminate the first SAM.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

Generation of Self-Assembled Monolayers (SAMs)

The approach taken was to make patterned SAMs of thiol-terminated organic molecules on a gold surface. The gold substrate used was gold evaporated on to a titanium layer that has been previously evaporated on to a silicon wafer having an oxide layer. The gold coating was made on 4 inch diameter silicon wafers in a Leybold 560 vapor deposition unit. The gold surface thus made was cleaned in a UV/ozone cleaner just prior to formation of the first SAM layer. On exposing this clean gold surface to an alkane thiol solution in ethanol a strong chemisorption resulted wherein the gold-thiol affinity could be employed to generate well-organized assemblies of the alkane thiol molecules on the surface. In this way a "brush" of molecules was formed with one end of each molecule attached to the gold substrate and the other end free of the substrate surface. This produced a gold surface next to an organic SAM surface on the same substrate, and both could be interrogated under identical conditions giving the difference in surface potential between the two areas. The simplest thiol attachment is at the 3-fold hollows in the Au (111) lattices shown by T. Uchihashi et al (*Applied Surface Science* 157, 244 (2000)).

The smoothness of the gold substrate is important for single molecule conductivity experiments which require atomically smooth gold surfaces, or at least smooth domains on the surfaces. However, when using the methods described herein the requirements are less demanding. Several processes for producing gold substrates were used. The substrates employed were CVD (chemical vapor deposited) gold on silicon that was not post-treated. The substrate exhibited a RMS roughness of 0.7 nm as measured by atomic force microscopy. Gold wafers were kept as fabricated in individual wafer carriers and were cleaned in a UV/ozone cleaner just before use to remove adsorbed organics. Surface particulate contamination and surface roughness were monitored frequently by atomic force microscopy.

Microcontact Printing Using Soft Lithography

Microcontact printing was used to generate patterned SAMs on gold as described in Y. Xia, et al., *Annu. Rev. Mater. Sci.*, 28, 153, (1998) and L. Yan, et al., *J. Am. Chem. Soc.*, 120, 6179, (1998), incorporated herein by reference. The following steps are carried out to generate a stamped SAM pattern: (1) a resist layer on a silicon wafer was patterned photolithographically, (2) a casting of the pattern was made with a flexible silicone elastomer, (3) the patterned surface of the silicone was coated with a very thin layer of organic thiol, and (4) the clean gold surface was stamped. Because only a very thin layer of thiol was deposited on the surface of the silicone stamp material, and because excess thiol was washed off, only a monolayer of organic thiol was transferred to the stamped regions of the gold. Ellipsometry on stamped and flooded unpatterned areas was used to obtain a SAM height to compare to the molecule length. Such comparisons can give indications of the density of the SAM and the orientation of the SAM molecules to the surface. Patterns consisting of two insulating organics and combinations of insulating and conjugated organics on gold were produced. The stamped pattern contained a variety of features with dimensions in the range of 2 μm to 20 μm. In one case Time-of-Flight Secondary Ion Mass Spectroscopy (TOF-SIMS) was used to confirm the chemical composition variation in the pattern.

Scanning Surface Potential Microscopy (SSPM)

The property variations associated with the compounds in the pattern features were characterized by AFM and SPPM. Using standard intermittent contact AFM, a grounded tip acquired the surface topography then retraced the topographic profile while maintaining a constant tip-sample separation. During the second scan, a dc bias ($V_{dc}$) and an ac bias ($V_{ac}*\cos((\omega t))$) were superimposed on the tip. This lead to a potential difference between tip and the sample that includes both components offset by the work function difference $\Delta\phi$ between the tip and sample. The force acting on the tip (and causing it to oscillate) at $\omega$ is eliminated when the adjustable tip bias and the sample surface potential are equal ($V_{dc}=V_{surf}+\Delta\phi$). Thus, mapping of the nulling potential $V_{dc}$ along the surface yielded the surface potential map.

These measurements were performed on a commercial instrument (Digital Instruments Nanoscope III) with WC tips (I≈225 μm, resonant frequency ~60 kHz). SSPM measurements were acquired from 200 nm above the surface at scan rates between 0.2 Hz to 1 Hz. The driving voltage amplitude, $V_{ac}$, was 5 V and frequency was ~130 kHz. Topographical images were processed by first order line flattening and potential images are plane fitted at zero order.

All compounds used were prepared as described in S. Percec, et al., *J. Polymer Sci.*, Part A, Vol. 42, 541–550 (2004), incorporated herein by reference.

Example 1

Patterned Insulating Alkanethiol SAM

Figure 1A:
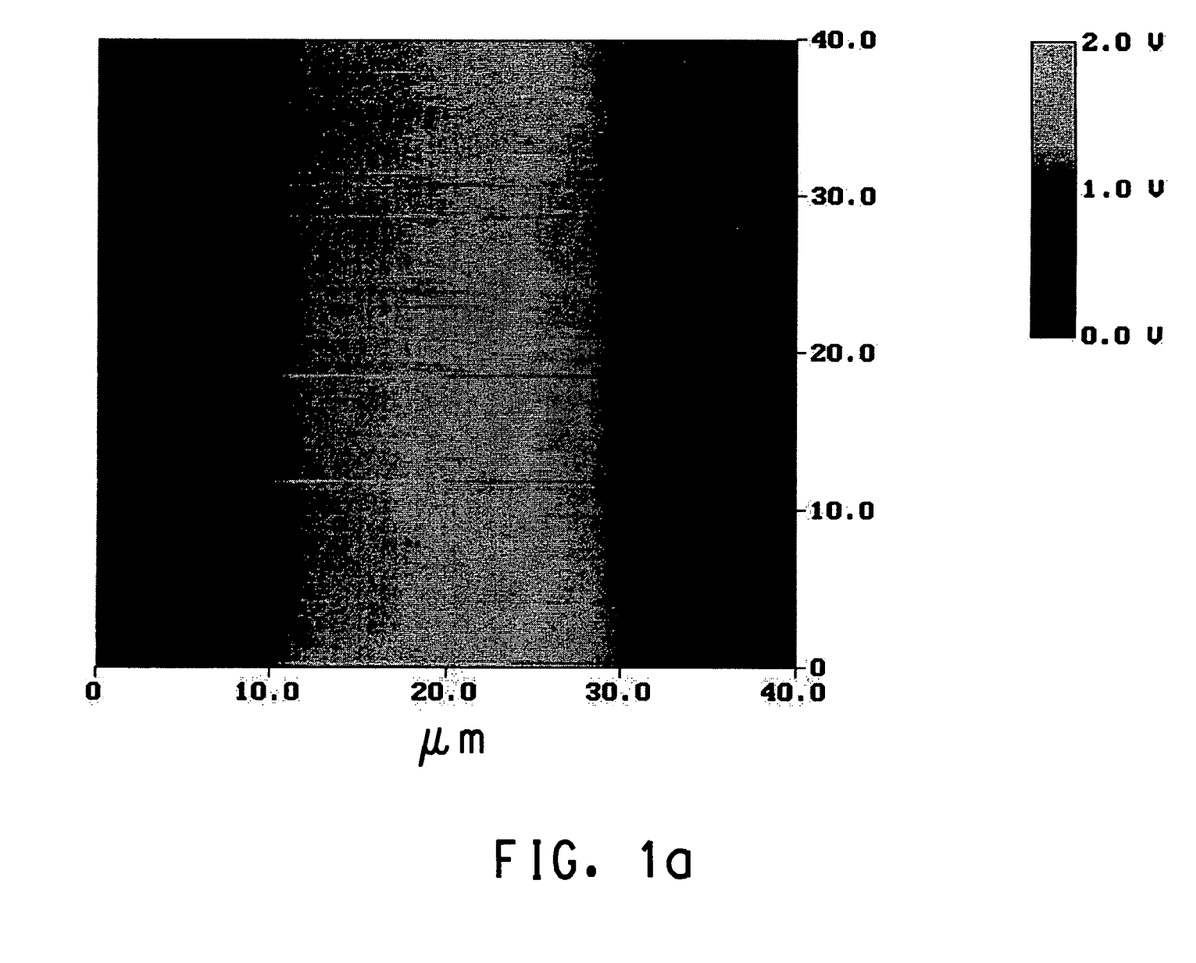
FIG. 1*a* is a SSPM image of 20 μm hexadecanethiol SAM on gold.
Figure 1B:
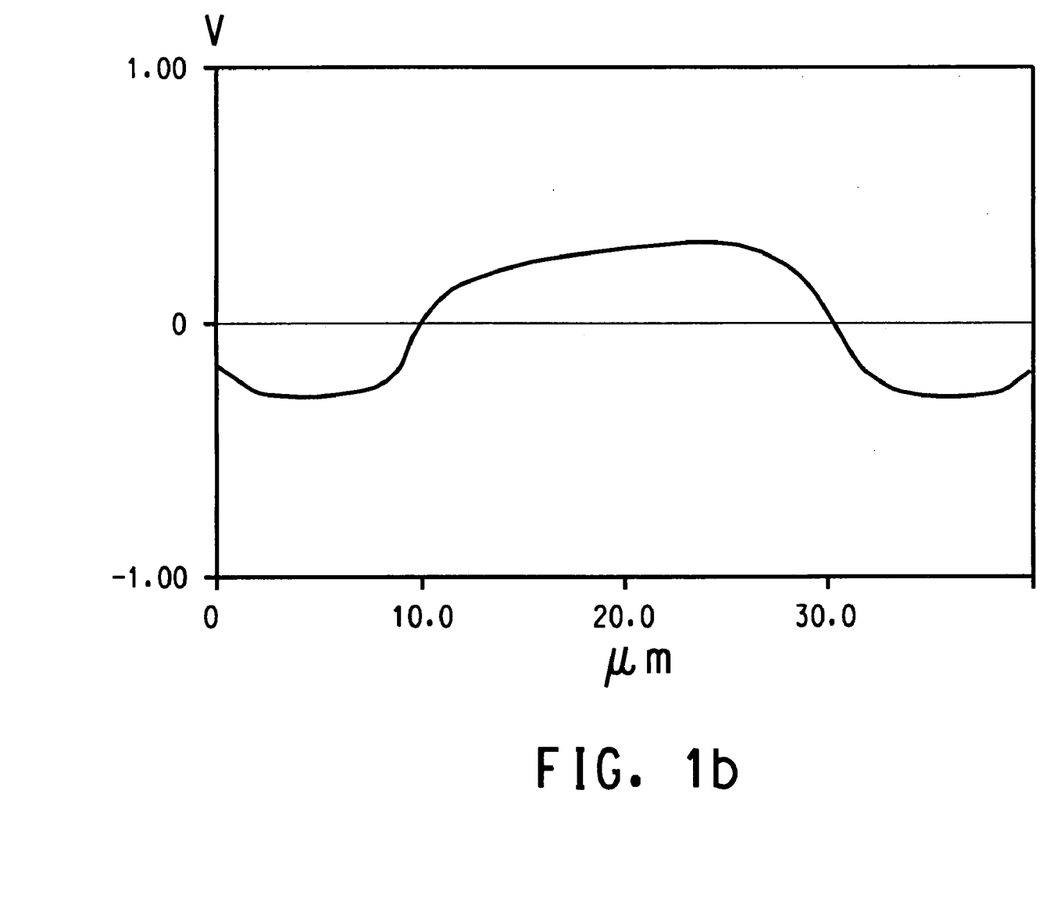
FIG. 1*b* is a potential profile extracted from FIG. 1*a* quantifying the observed potential variation.

FIG. 1a shows a 20 μm line width/40 μm pitch pattern of hexadecanethio][$CH_3(CH_2)_{15}SH$] (HDT) on a gold substrate that demonstrates that the more positive surface potential is associated with the HDT monolayer. The surface potential for hexadecanethiol on gold was reproducible for preparations made at different times and were stable for up to 2 weeks, with no special storage conditions. The measured surface potential difference was 0.5 V as seen in FIG. 1b. The height of a stamped HDT SAM was measured by ellipsometry at 18 Å, in good agreement with the length of HDT (~21 Å) and indicating a well formed SAM with molecules approximately perpendicular to the gold surface.

Example 2

Patterned Insulating Fluoroalkanethiol SAM

Figure 2A:
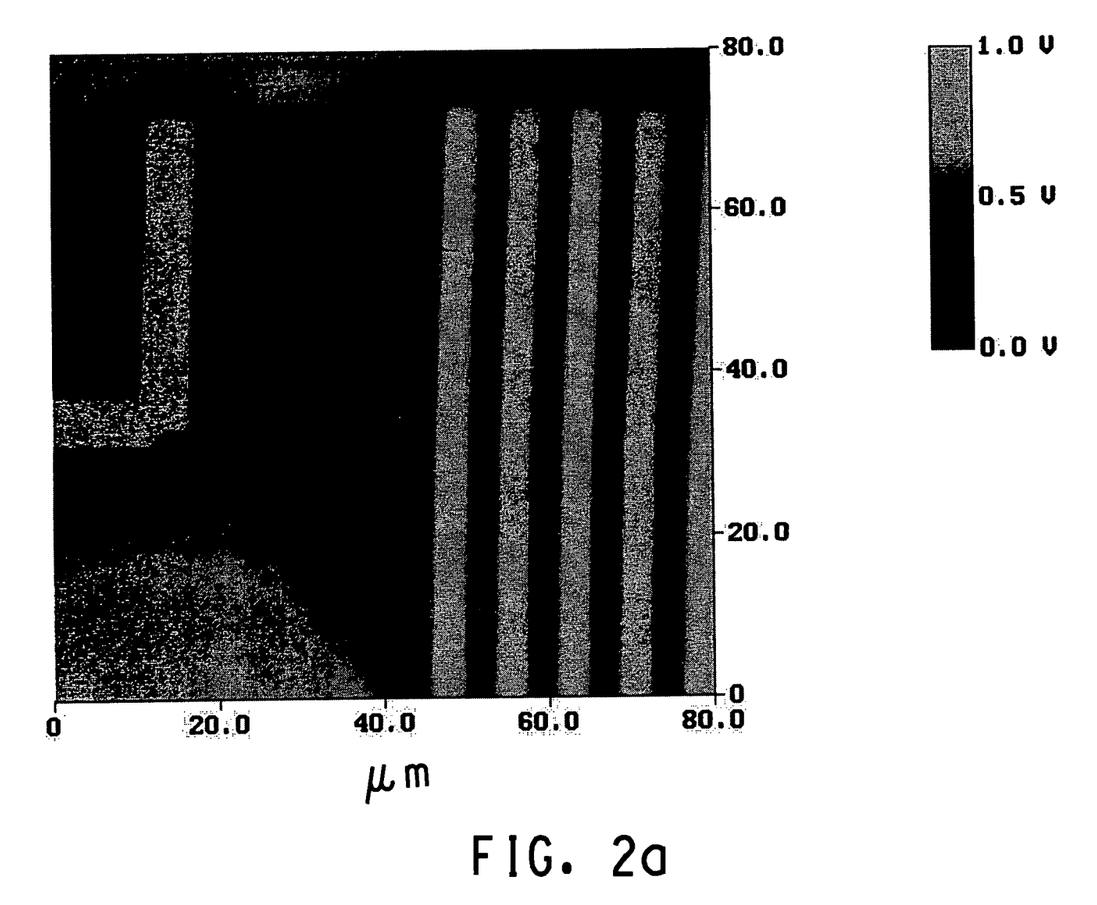
FIG. 2*a* is a SSPM of 4 μm lines and spaces of FDT on gold.
Figure 2B:
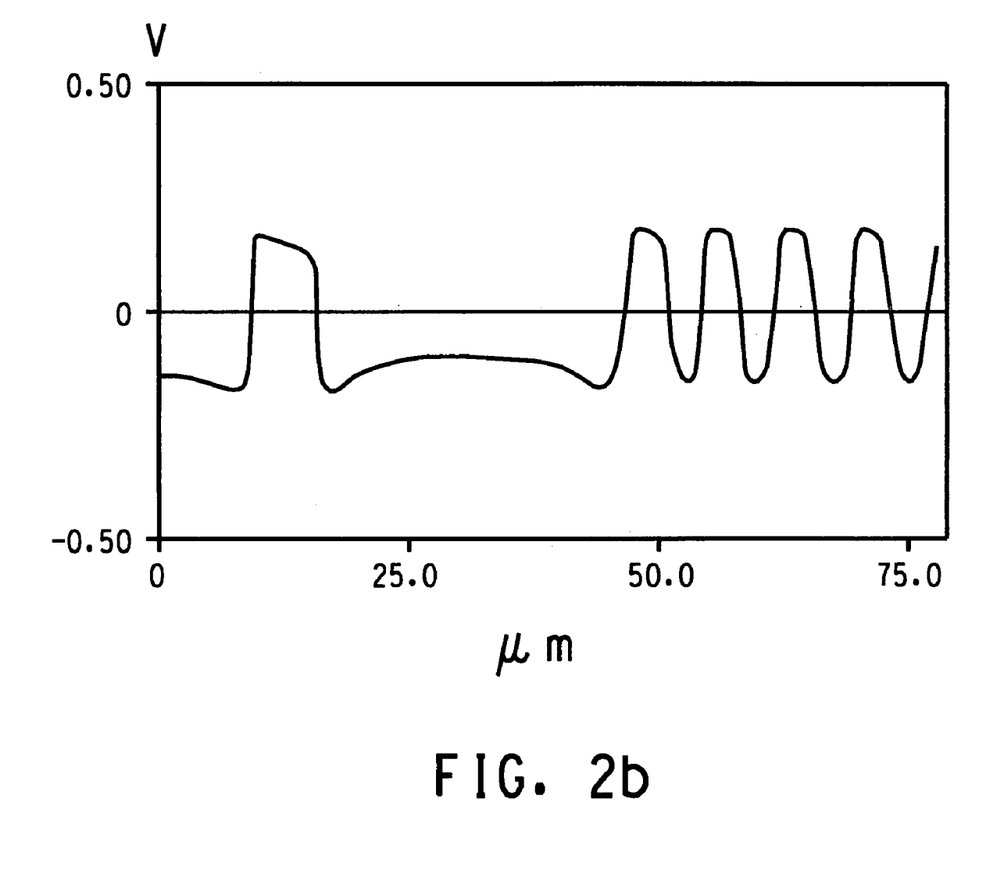
FIG. 2*b* is a potential profile of FIG. 2*a*.
Figure 2C:
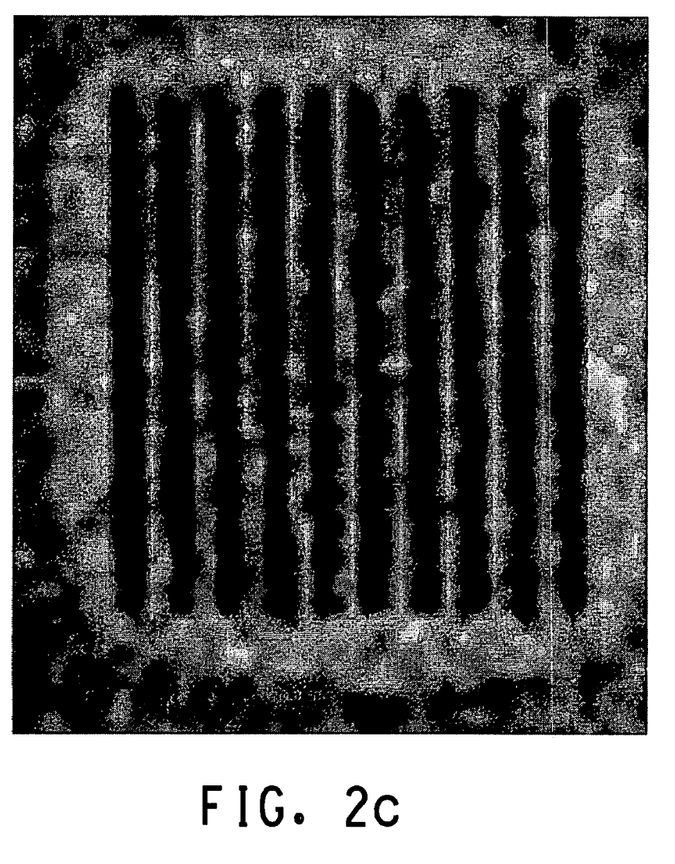
FIG. 2*c* is a TOF-SIMS image of the 4 μm lines and spaces of FIG. 2*a*.

FIG. 2a shows a gold surface stamped with 1,1,1,2,2,3,3,4,4,5,5,6,6,7,7,8,8-heptadecanefluoro-10-decane thio [$CF_3(CF_2)_7(CH_2)_2SH$] (FDT). In this figure, the reversed image of the number "4" can be seen indicating nominal 4 μm lines and spaces. A "halo" effect can be seen where the roof of the soft stamp collapses and touches the substrate (top and bottom left corners of the image). The measured surface potential difference was 0.2 V (FIG. 2b). TOF-SIMS was used to confirm the presence of the FDT pattern (FIG. 2c). The contrast from the fluorine signal (FIG. 2c) shows the stamped 4 μm pattern, but with less definition than that seen with SSPM (FIG. 2a).

Example 3

Patterns of Two Interleaved SAMs

Figure 3:
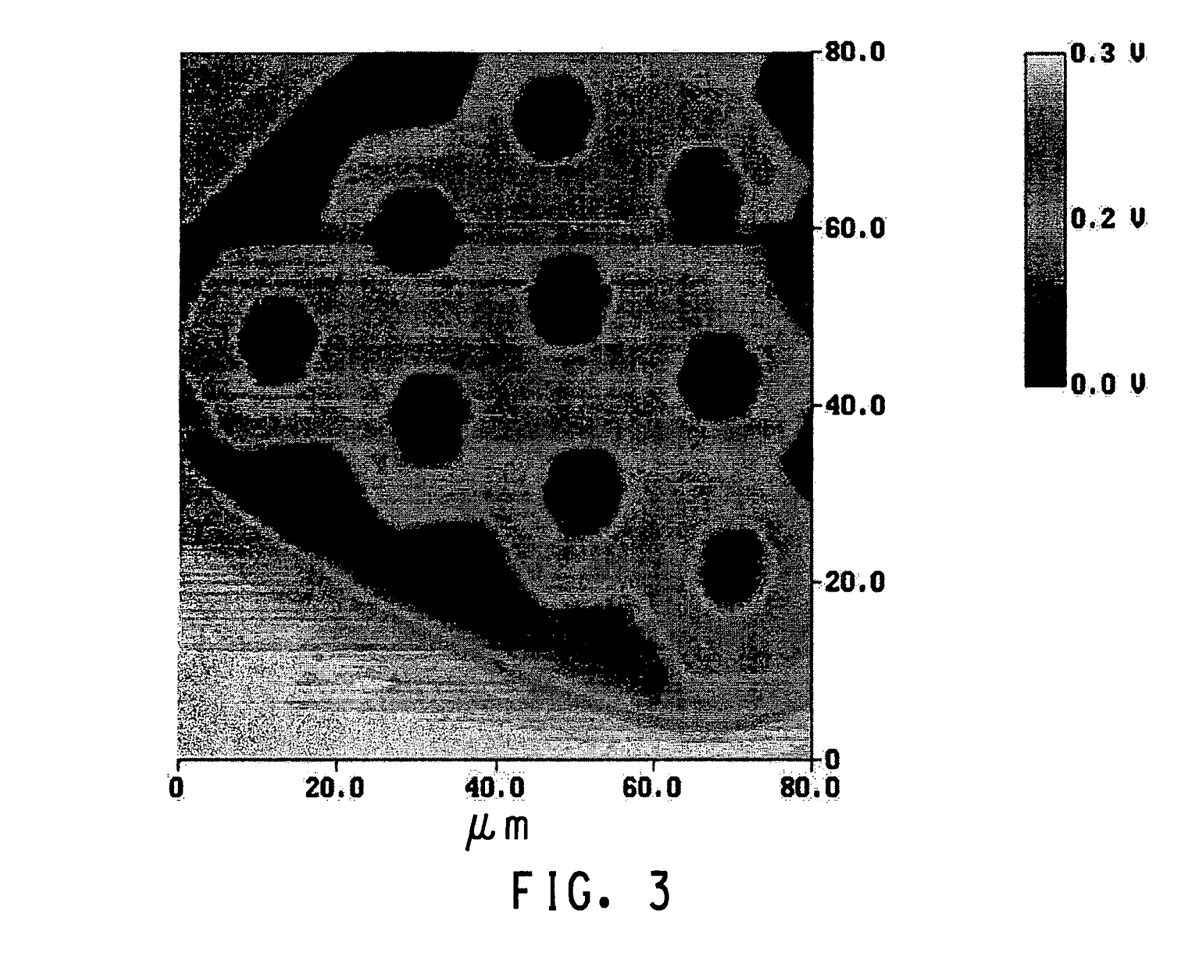
FIG. 3 is a SSPM of HDT SAM with FDT flood.

An initial stamp of HDT on gold followed by flooding with FDT which adheres to any gold surface not stamped with HDT resulted in a relative surface potential difference of ~0.2 V, with the HDT being the more positive surface. This was in agreement with the respective surface potentials of HDT and FDT over gold and indicates that the FDT does not attach to the HDT SAM. Wetting angle measurements were made and indicate that the HDT SAM surface was not changed by the FDT flood. FIG. 3 is a SSPM scan of the patterned composite SAM; the small hexagons are ~7 μm across.

Example 4

Patterned Conjugated Molecule SAM

Figure 4A:
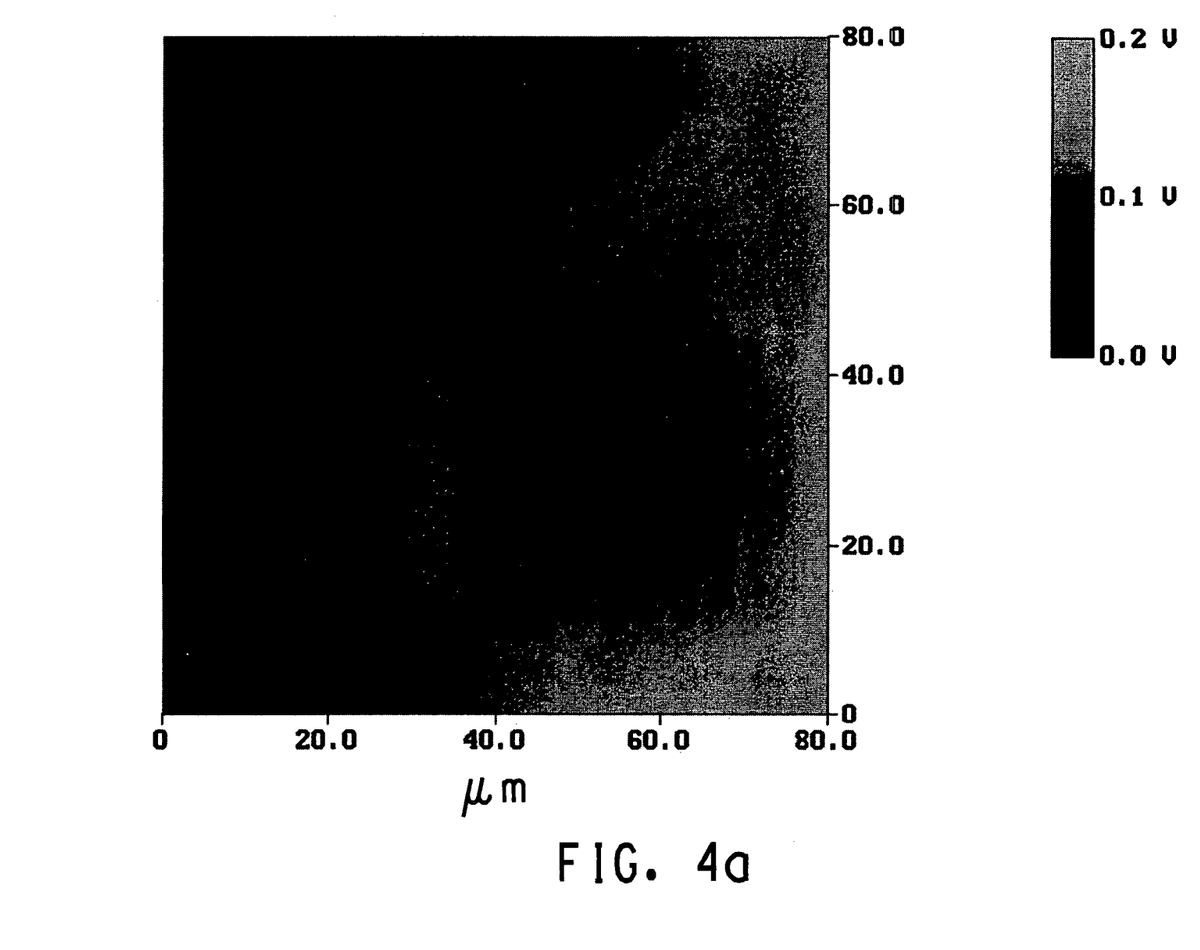
FIG. 4*a* is a SSPM of 2 μm lines and spaces for PETB on gold.
Figure 4B:
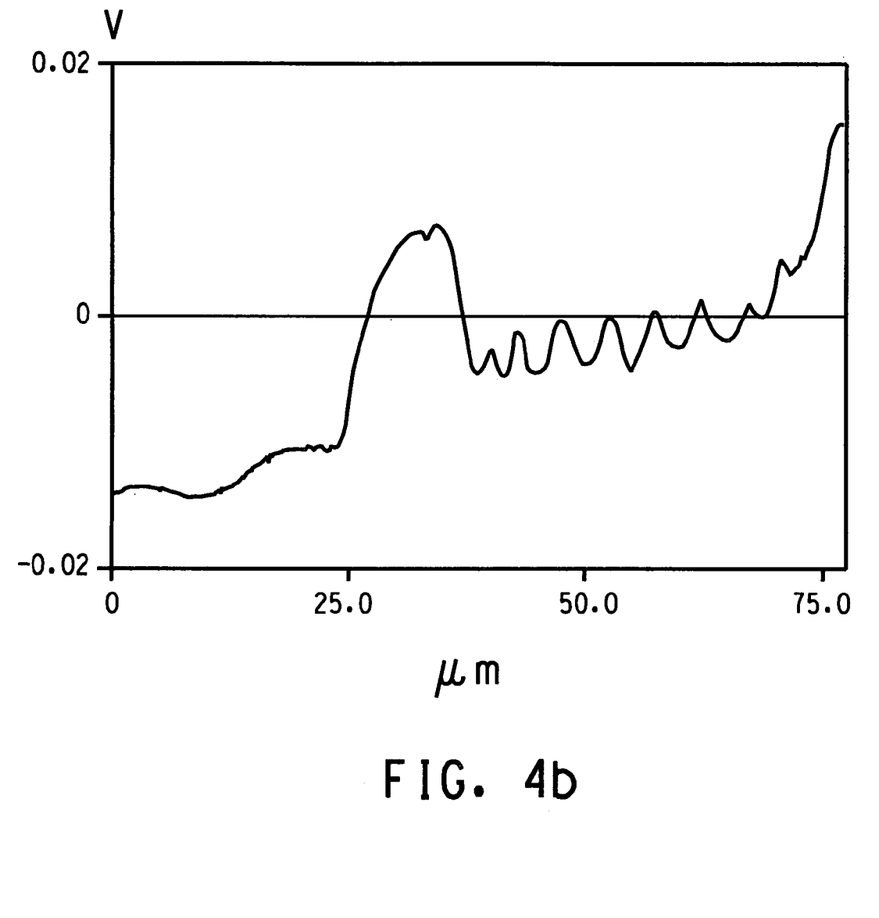
FIG. 4*b* is a potential profile from FIG. 4*a*.

When a conjugated molecule, 1-phenyl ethynyl-4-thioacetyl benzene (PETB), was stamped on gold the PETB SAM 2 μm lines had a surface potential 2 mV more negative than gold (FIG. 4*a*). The solid area PETB (on the left side in FIG. 4*b*) shows −20 mV surface potential with respect to gold. Note the order of magnitude smaller relative surface potential and the switch in the SAM shading to dark as compared to the data in FIGS. 1*a* and 2*a*. The data in FIG. 4*b* are averaged over an area, resulting in reduced noise. In a repeat measurement the gold-PETB surface potential difference was again ~20 mV. The height of a stamped PETB SAM was measured by ellipsometry at 14 Å, in good agreement with the length of PETB (~12 Å) and indicating a well formed SAM with molecules approximately perpendicular to the gold surface.

Example 5

Surface Potential Data

The surface potential data for the 5 molecules described in Examples 1–4 are given in Table 1 below. The three highly conjugated molecules are expected to be conducting (PETB, EFTB and EFCB) whereas the other two are expected to be non-conducting because they are alkanes and not highly conjugated. The surface potential data in Table 1 below for EFTB and EFCB were obtained using the protocols employed in Examples 1, 2 and 4 above. The measured surface potentials were high (0.5 V) for the non-conducting molecules (HDT and FDT) and low (20 to 40 mV) for the conducting molecules. For HDT, PETB and EFTB the measured thickness of the SAMs indicate good monolayer formation with molecules approximately perpendicular to the gold surface. Both FDT and EFCB form less ideal SAMs, but still generate good stamped patterns that can be seen by scanning surface potential measurements.

This shows that on a relative basis, electrical aspects of SAM molecules can be observed by SSPM. SSPM is an excellent technique for imaging micro-patterned SAMs. It can show superior contrast to tapping mode AFM for imaging alkanethiol and fluoroalkanethiol SAMs on gold. The lateral spatial resolution of patterned SAMs by SSPM is accurate, though the image was obtained 200 nm above the surface. In addition, SSPM lends itself to evaluating the stability of SAMs by following the measured surface potential over time.

TABLE 1

| Molecule | SAM Thickness (Å) (Flooded) | Molecule Length (Å) (Deprotected) | Surface Potential (Stamped) |
|---|---|---|---|
| HDT | 18.3 | 21.5 | 0.5 V vs. Au |
| FDT | 5.5 | 13.8 | 0.2 V vs. Au |
| PETB | 13.6 | 10.3 | 20 mV vs. Au |
| EFTB | 12.8 | 12.7 | 20 mV vs. Au |
| EFCB | 35 | 21.7 | 40 mV vs. Au |
| ECB | 10.7 | 21.7 | 17 mV vs. Au |
| E2CB | 9.9 | 21.7 | 7 mV vs. Au |

HDT: hexadecanethiol
EDT: $CF_3(CF_2)_7(CH_2)_2SH$
PETB: 1-phenyl ethynyl-4-thioacetyl benzene
EFTB: 1-ethynyl-4-fluorobenzene-4'-(thioacetyl)benzene
EFCB: 4-ethynyl(2-fluoro-cyanobenzene)-4'-(ethynylphenyl)-1(2-fluoro-cyanobenzene)
ECB: 4-ethynyl-cyanobenzene-4'-ethynylphenyl-cyanobenzene
E2CB: 4-ethynyl(1,2-dicyanobenzene)-4'-ethynylphenyl-1(4,5-dicyanobenzene)

What is claimed is:

1. A method to determine the molecular electrical conductivity of a compound, comprising the steps of:
    a) providing a compound which forms self-assembled monolayers;
    b) forming a self-assembled monolayer of the compound on a substrate; and
    c) measuring the difference between the surface potential of the substrate and the surface potential of the self-assembled monolayer comprising the step of using surface scanning potential mapping, whereby the molecular electrical conductivity of the compound is determined.

2. The method of claim 1 wherein the substrate is metallic.

3. The method of claim 1 wherein the substrate is selected from the group consisting of Au, Ag, Pd, Pt, Cu, Al and Ni.

4. A method to determine the relative molecular electrical conductivities of a plurality of compounds, comprising the steps of:
    a) providing a plurality of compounds which form self-assembled monolayers;
    b) forming a discrete area of a self-assembled monolayer for each compound of (a) on a single substrate;
    c) measuring the surface potential of each discrete area comprising the step of using surface scanning potential mapping for each self-assembled monolayer; and
    d) comparing the measured surface potentials of (c) to determine the relative molecular electrical conductivities of the plurality of compounds.

5. The method of claim 4 wherein the substrate is metallic.

6. The method of claim 5 wherein the substrate is selected from the group consisting of Au, Ag, Pd, Pt, Cu, Al and Ni.

* * * * *